Figures 1, 2, 3:
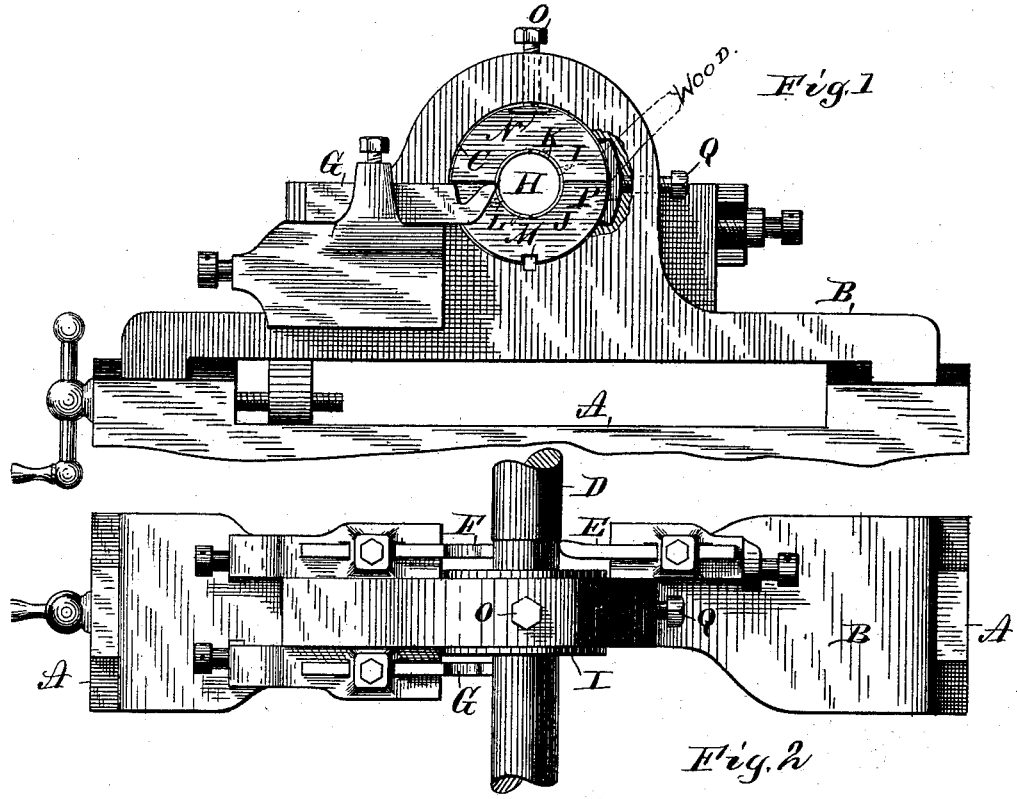

(No Model.)

P. O'NEIL.
LATHE REST.

No. 338,291. Patented Mar. 23, 1886.

Witnesses
G. W. Gridley
E. R. Inman

Inventor
Philip O'Neil
By Erwin & Benedict
Attorneys

UNITED STATES PATENT OFFICE.

PHILIP O'NEIL, OF MILWAUKEE, WISCONSIN.

LATHE-REST.

SPECIFICATION forming part of Letters Patent No. 338,291, dated March 23, 1886.

Application filed January 23, 1886. Serial No. 189,447. (No model.)

*To all whom it may concern:*

Be it known that I, PHILIP O'NEIL, of Milwaukee, in the county of Milwaukee and State of Wisconsin, have invented new and useful Improvements in Lathe-Rests; and I do hereby declare the following to be a full, clear, and exact description of said invention, reference being had to the accompanying drawings, and to the letters or figures of reference marked thereon, which form a part of this specification.

My invention relates specifically to that class of lathe-rests used with shaft-turning lathes for supporting the shaft while being turned.

In turning long shafting in a lathe with cutting-tools it is necessary to support the shaft between the ends to secure the proper steadiness and correctness of motion of the shaft.

Heretofore it has been common when turning iron shafting to use a rest provided with a solid steel ring or bushing, in which the shaft was supported and revolved, which ring or bushing, in order to secure a proper line or true motion of the shaft, was fixed solidly in the frame of the rest and provided with a central aperture only just large enough to receive the finished part of the shaft, so that constant watching and care of the lathe were required, lest in some manner the shaft should not be cut truly and of even and correct size; for if the shaft by any accident or oversight was not cut true, or was not cut down to proper size, the moment such part was carried into the solid steel bushing the shaft would so bind in the bushing as to either stop the lathe against all the force acting on it or break or tear some parts asunder under the unprovided-for strain.

It not infrequently occurs that by reason of a little sand in the iron the edge of the cutting-tool is taken off, and the tool is by so much shortened, whereby the tool cuts slightly less into the shaft and the shaft is by so much enlarged, and if such enlarged part is carried forward into the solid steel bushing then something must give way or the machine stop, as above stated. On account of such liability to break or injure the lathe, constant watchfulness and great care are necessary to operate a lathe with such unyielding bushing, and the amount of work done therewith by reason of the care required is quite limited.

The object of my invention is to provide a device that will constantly and firmly hold the shafting in line, and at the same time obviate the liability to damage by reason of the accidental enlargement of the shaft in turning, or other slight variation of its true position, by the use of which device I am enabled, by reason of the less care required and the greater rapidity with which the lathe can be safely run, to increase the amount of work that can be done on the lathe from fifty to one hundred per cent. over what can be done when using the solid steel bushing, and to do this increased work with much less attention than by the old way.

In the drawings, Figure 1 is an elevation of a combined tool-holder and lathe-rest with my improved bushing in it. Fig. 2 is a plan of the combined tool-holder and lathe-rest. Fig. 3 is a detail.

The same letters refer to like parts in all the views.

The lathe-rest and tool-holder combined (shown in Figs. 1 and 2) is one of the many forms used on engine-shaft-turning lathes, and its base A (shown in part) is supported and travels laterally (as to the rest) on the ways of the bed-plate of the lathe. The upper part or frame, B, of the lathe is supported and adjustable lengthwise of itself (laterally of the lathe bed-plate) on the base A.

The frame B is provided with a central aperture, C, for a bearing for the shaft D while the shaft is in the lathe being turned, which aperture is provided with my improved bushing, hereinafter to be described.

The combined tool-holder and rest shown in Figs. 1 and 2 is provided with cutting-tool E, F, and G, adjustable and secured in position in the tool-holder in sockets with set-screws, in the usual manner.

The cutting-tools may be attached to the lathe-rest in which my device is located, as shown in Figs. 1 and 2, or may be affixed to a separate tool-holder.

My improved bushing consists of cylindrical blocks constructed in two semi-cylindrical parts, I and J, of a proper size to fit closely into the aperture C, and is provided with a central longitudinal circular aperture, H, of proper size to receive the shaft D. These blocks I and J are lined about their central aperture with thin semicircular plates of metal K and L, preferably of steel, one of which plates is affixed to each of the blocks I and J, being so located that the one half of the lining-plate is against the block to which it is affixed, and the other half extends beyond and laps against the other block, so that each block is half lined by each plate when in position in the aperture C, and being so constructed the blocks I and J are independent of each other. The lower block, J, is provided with a slot, M, opposite a corresponding slot in the frame B, into which a key is inserted to restrain the blocks from rotating in the aperture C under the influence of the therein rotating shaft D.

The blocks I and J are constructed of wood, preferably of seasoned hard maple, which material is sufficiently strong and unyielding when inserted firmly in the aperture C to hold the shaft steadily and truly in position, but which, under the powerful pressure of a slightly-increased size of the shaft, will yield sufficiently to not stop the lathe or break the parts.

I do not wish to confine my invention strictly to blocks constructed of wood, for other material, like papier-maché, may be used, which, like wood, while unyielding under ordinary pressure, will, under great pressure, yield slightly, so as to obviate the breaking or straining of the lathe, which are the occurrences to be provided against.

While the blocks I and J are intended to fit closely in the aperture C, yet, as under variations in the state of the atmosphere or from catching some of the water used on the cutting-tools, these blocks, being constructed of wood, are liable to expand and contract, I insert a small steel plate, N, in the top outside of the upper block, I, against which a set-screw, O, turning in and through the frame B, is made to press, whereby the blocks I and J may be held together vertically, and I insert a loose steel plate, P, in the side of the frame B, in a recess opening from the aperture C, which plate P on its inside bears against the blocks I and J, and is held up against them by the set-screw Q, turning in and through the frame B against the plate P, whereby the shrinkage of the blocks I and J is provided against laterally, it being understood that the expansion and contraction of these blocks are so slight that the adjustment required is very little indeed.

What I claim as new, and desire to secure by Letters Patent, is—

1. In a rest for a shaft-turning lathe, a bushing for the shaft-bearing, constructed of wood or other material yielding only under great pressure, substantially as described.

2. In a rest for a shaft-turning lathe, a bushing for the shaft-bearing aperture, constructed of wood or other material yielding only under great pressure, and lined with sheet metal, substantially as described.

3. In a rest for a shaft-turning lathe, the combination of frame B with the semi-cylindrical blocks I and J, and the sheet-metal lining K and L, substantially as described.

4. The combination of lathe-rest frame B, semi-cylindrical blocks I and J, metal linings K and L, plate P, and set-screws O and Q, substantially as described.

In testimony whereof I affix my signature in presence of two witnesses.

PHILIP O'NEIL.

Witnesses:
CARRIE E. STAGER,
C. T. BENEDICT.